(12) United States Patent
Sugiyama

(10) Patent No.: US 8,264,708 B2
(45) Date of Patent: Sep. 11, 2012

(54) PRINTING SYSTEM

(75) Inventor: Hiroki Sugiyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 754 days.

(21) Appl. No.: 12/382,776

(22) Filed: Mar. 24, 2009

(65) Prior Publication Data

US 2009/0237716 A1 Sep. 24, 2009

(30) Foreign Application Priority Data

Mar. 24, 2008 (JP) ................. 2008-076890

(51) Int. Cl.
 *G06F 15/00* (2006.01)
 *G01R 7/00* (2006.01)
(52) U.S. Cl. ...................... 358/1.14; 324/142
(58) Field of Classification Search ............. 358/1.13, 358/1.15

See application file for complete search history.

(56) References Cited

U.S. PATENT DOCUMENTS

2007/0198102 A1  8/2007  Umehara et al.
2009/0185147 A1*  7/2009  Alaganchetty et al. ....... 353/121

FOREIGN PATENT DOCUMENTS

JP  2004-110741  4/2004
JP  2007-249941  9/2007

* cited by examiner

*Primary Examiner* — Saeid Ebrahimi Dehkordy
(74) *Attorney, Agent, or Firm* — Edwards Wildman Palmer LLP; George W. Neuner

(57) ABSTRACT

A printing system is provided. A user directs an instruction apparatus to an electronic board in a state where an image of image data to be desirably printed is displayed, and presses a file selection button. While pressing the file selection button, the user directs the instruction apparatus to a printer desirably caused to print, and while directing the instruction apparatus to the printer, the user releases the file selection button. When the print instruction button is pressed while the instruction apparatus being directed to the printer, desired image data is printed from the printer to which the instruction apparatus is directed.

6 Claims, 7 Drawing Sheets

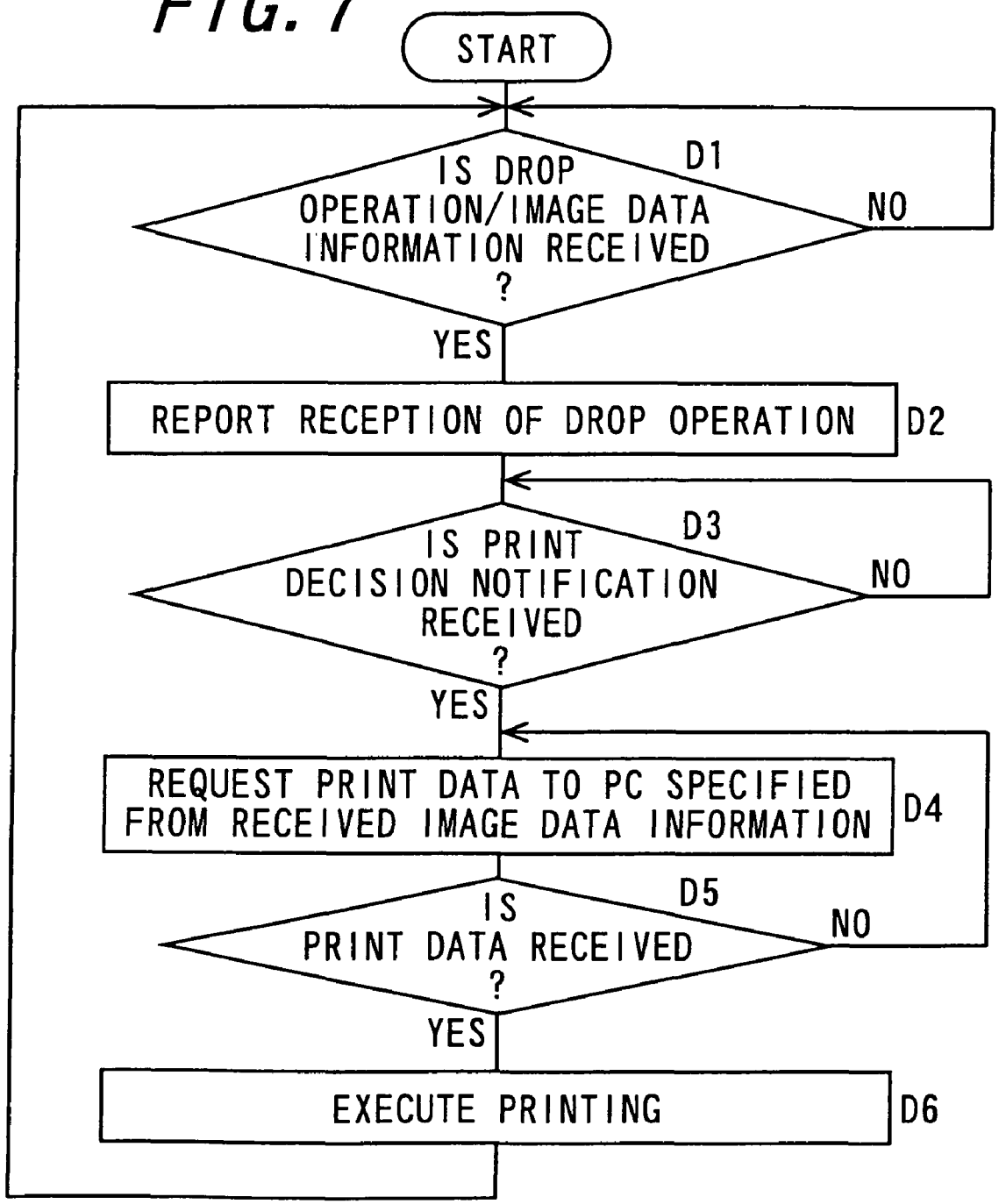

PRINTING SYSTEM

CROSS-REFERENCE TO RELATED APPLICATION

This application claims priority to Japanese Patent Application No. 2008-076890, which was filed on Mar. 24, 2008, the contents of which are incorporated herein by reference in its entirety.

BACKGROUND OF THE INVENTION

1. Field of the Invention

The present invention relates to a printing system for printing image data displayed on a display apparatus such as an electronic board with a printing apparatus.

2. Description of the Related Art

As an information device for displaying and explaining various kinds of information to a plurality of viewers at meetings, business presentations, education, training and the like, an electronic board is used. The electric board has a structure where a coordinate input apparatus such as a touch panel, and a display apparatus such as a liquid crystal display are integrally provided.

By connecting the electronic board and a PC (personal computer) so as to allow data communication, image data such as materials held in the PC is capable of being displayed on a display apparatus of the electronic board. Further, to an image displayed on the display apparatus, it is possible to edit the displayed image in real time by inputting handwritten characters using a touch panel, and the like.

Moreover, the electronic board is often used in a conference hall or a presentation hall as described above, and materials that has been displayed on the electronic board is also often printed and distributed to viewers after explanation of the materials.

For printing the materials, an instruction to execute printing is inputted by operating, for example, a pointer displayed on the display apparatus. At this time, a presenter is required to perform an operation for instruction input to the display apparatus of the electronic board. Since the display apparatus often has a large-sized screen, the presenter moves and operates to input the print instruction, which makes an operational load greater. Further, in a case where the presenter is unfamiliar with use of the electronic board, when an operational content necessary to print the materials is complicated, the load on the presenter becomes much greater.

In a print instruction apparatus described in Japanese Unexamined Patent Publication JP-A 2004-110741, a print file is dragged and dropped to a print setting folder in which a plurality of items of printing conditions are set, whereby the print file is transmitted to a printing apparatus to be printed based on the printing conditions set in the print setting folder.

The print instruction apparatus described in JP-A 2004-110741 allows printing by drag and drop, simply and without setting printing conditions, so the load of the work is reduced. However, since only an icon of the print setting folder is displayed on the display, only a builder of the icon can recognize printing conditions that, for example, which printer prints by dropping to which folder, and therefore, the application to an apparatus used by non-exclusive people, such as an electronic board, does not reduce the load on a presenter sufficiently.

SUMMARY OF THE INVENTION

An object of the invention is to provide a printing system in which an operation for an instruction of printing is intuitively performed to significantly reduce the load on a user.

The invention provides a printing system comprising: a display apparatus for displaying image data; a printing apparatus for printing the image data; an instruction apparatus for instructing to transmit the displayed image data to the printing apparatus; and a converting apparatus having a file converting section for converting the transmission-instructed image data into print data printable by the printing apparatus specified as a transmission destination, the display apparatus, printing apparatus, the instruction apparatus, and the converting apparatus being connected so as to allow data communication, the instruction apparatus including a first input section for selecting image data and a second input section for inputting decision of printing, and in a state where image data is displayed on the display apparatus, the first input section being operated, and in a state where the first input section is operated, the instruction apparatus being directed to the printing apparatus and an operation at the first inputting section being completed, then the converting apparatus converting the displayed image data into print data printable by the printing apparatus to which the instruction apparatus is directed to transmit to the printing apparatus, and in the case where the instruction apparatus is directed to the printing apparatus and the second input section is operated, the printing apparatus printing the print data transmitted from the converting apparatus.

According to the invention, an instruction apparatus is held by a user, and in a state where image data is displayed on a display apparatus, a first input section of the instruction apparatus is operated, further, in a state where the first input section is operated, the instruction apparatus is directed to a printing apparatus and an operation at the first input section is completed, then, it is determined that the printing apparatus to which the instruction apparatus is directed is selected as a print destination, and the converting apparatus converts the displayed image data into print data printable by the printing apparatus to which the instruction apparatus is directed to transmit to the printing apparatus.

In the case where the instruction apparatus is directed to the printing apparatus and the second input section is operated, the printing apparatus prints the print data transmitted from the converting apparatus.

By such operations, it is possible to perform selection of a print destination for image data presently displayed on the display apparatus with an operational feeling like a drag and drop operation, and it is possible to give a print instruction with an operational feeling like a click operation, thus the operations are intuitively performed and the load on a user is reduced significantly.

Further, in the invention, it is preferable that the printing apparatus includes a reporting section for detecting completion of the operation at the first input section and reporting the detection to a user.

According to the invention, the printing apparatus detects completion of the operation at the first input section and reports the detection to a user, thereby the user is capable of confirming the printing apparatus specified as a print destination.

Further, in the invention, it is preferable that the instruction apparatus has an element for indicating that the first inputting section is operating effectively.

According to the invention, a user is capable of easily confirming that the first input section is operating effectively.

Further, in the invention, it is preferable that the instruction apparatus has an element for indicating that the second input section is operating effectively.

According to the invention, a user is capable of easily confirming that the second input section is operating effectively.

Further, in the invention, it is preferable that the display apparatus has a reporting section for display for indicating that the displayed image data has been selected by the instruction apparatus.

According to the invention, the display apparatus has a reporting section for display for indicating that the displayed image data has been selected by the instruction apparatus. Accordingly, the user can recognize that the displayed image data has been selected by the instructions apparatus.

Further, in the invention, it is preferable that the printing apparatus has a reporting section for printing for indicating that a print request for the displayed image data has been received.

According to the invention, the printing apparatus has a reporting section for printing for indicating that a print request for the displayed image data has been received. Accordingly, the user can recognize that the printing apparatus has received the print request for the displayed image data.

BRIEF DESCRIPTION OF THE DRAWINGS

Other and further objects, features, and advantages of the invention will be more explicit from the following detailed description taken with reference to the drawings wherein:

FIG. 7 is a flowchart showing print instruction processing in a printer.

DETAILED DESCRIPTION

Figure 1:
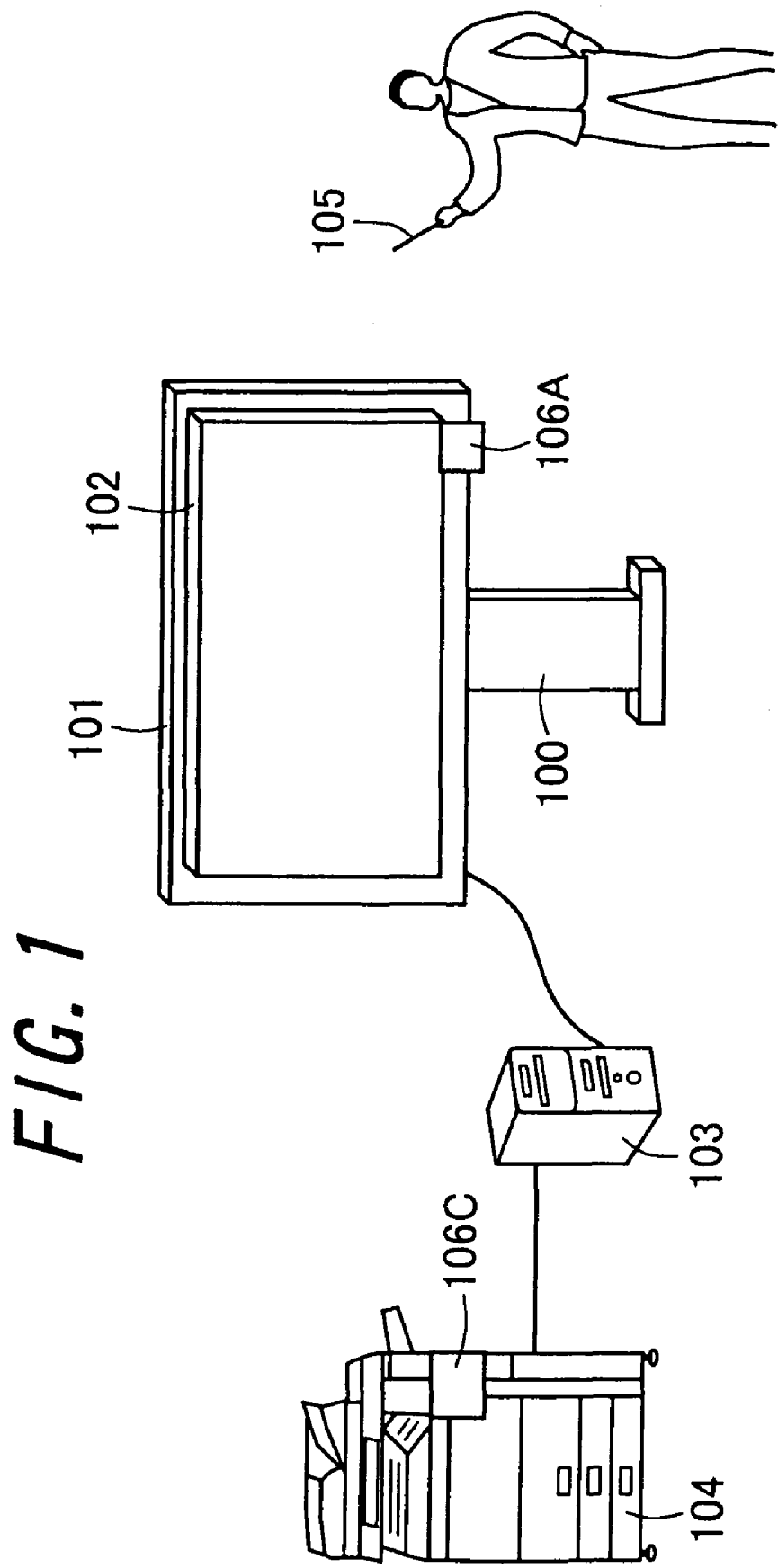
FIG. 1 is a view schematically showing the structure of a printing system for meeting according to an embodiment of the invention.

Now referring to the drawings, preferred embodiments of the invention will be described in detail.

FIG. 1 is a view schematically showing the structure of a printing system for meeting 1 according to an embodiment of the invention. The printing system for meeting 1 includes an electronic board 100, a PC 103, a printer 104, and an instruction apparatus 105. The electronic board 100 includes an input apparatus 101 for acquiring a coordinate inputted from an instruction section such as a user's finger or a pen and transmitting coordinate information based on the acquired coordinate to the PC 103, and a display apparatus 102 realized by a large-sized liquid crystal display or the like.

The display apparatus 102 acquires image data formed by various kinds of applications running on the PC 103 to display on the display. The input apparatus 101 and the display apparatus 102 are integrally constituted. Note that, image data in the invention is not limited to images having described contents of graphics, photos and the like, but text data such as characters and marks is also handled as the image data.

Further, in the printing system for meeting 1, the PC 103 is connected through a network for data communication to the printer 104 and the electronic board 100 so as to allow data communication.

The instruction apparatus 105 is a pointer that is operated by user to explain images displayed on the display apparatus 102 of the electronic board 100.

Further, the electronic board 100 has a laser transmitting/receiving section 106A for receiving information indicating operational contents of the instruction apparatus 105, and the printer 104 has a laser transmitting/receiving section 106C for receiving information indicating operational contents of the instruction apparatus 105.

Figure 2:
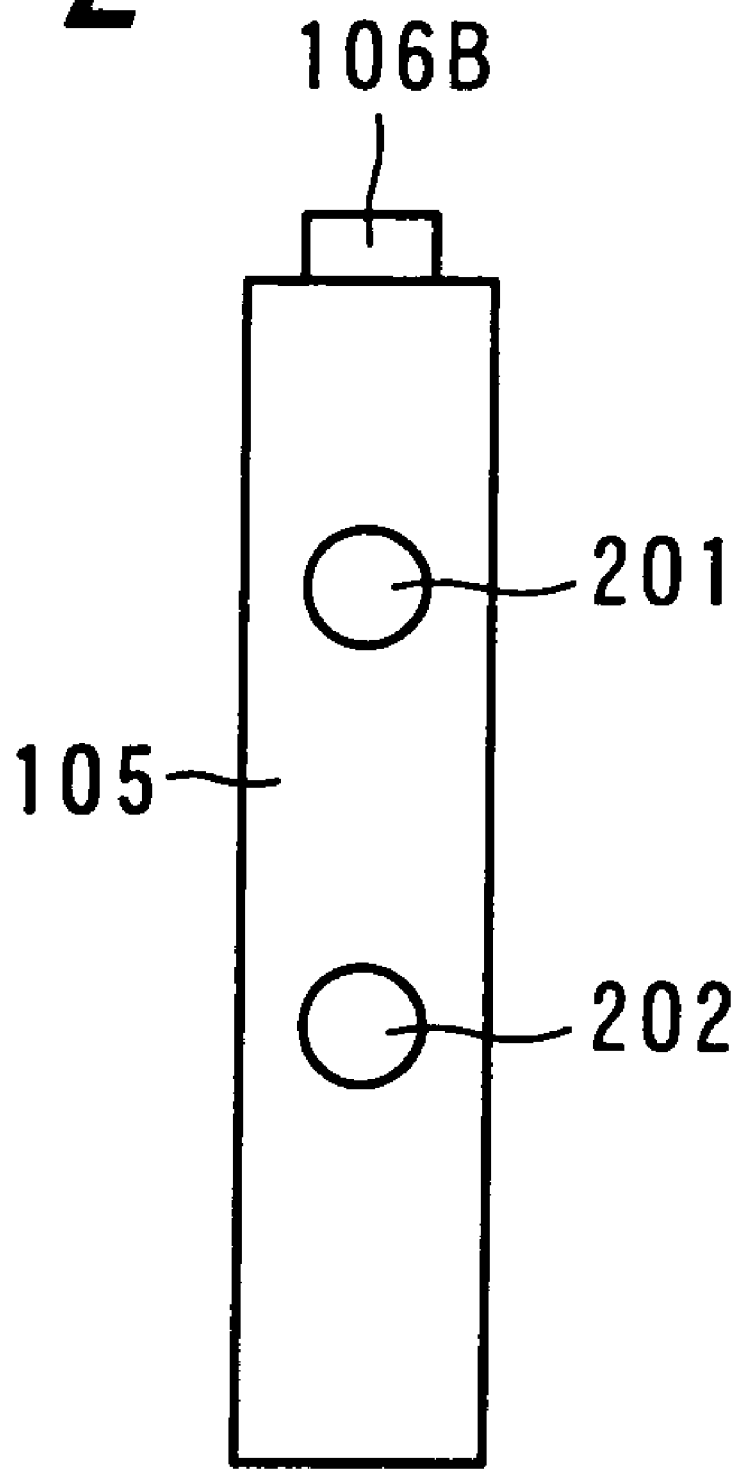
FIG. 2 is an external view showing the structure of an instruction apparatus.

FIG. 2 is an external view showing the structure of the instruction apparatus 105.

The instruction apparatus 105 has a laser transmitting/receiving section 106B, a file selection button 201, and a print decision button 202.

When the file selection button 201 is pressed by a user, the laser transmitting/receiving section 106B irradiates the laser transmitting/receiving section 106A of the electronic board 100 with laser light to transmit information indicating operational contents. At this time, the file selection button 201 is illuminated. Further, when the print decision button 202 is pressed, the laser transmitting/receiving section 106B irradiates the laser transmitting/receiving section 106C of the printer 104 with laser light to transmit information indicating operational contents. At this time, the print decision button 202 is illuminated.

As described in detail below, for the laser light irradiated from the laser transmitting/receiving section 106B, laser light having high directivity is preferably used and, for example, infrared laser is used.

Further, a directing direction of the laser light is constituted so as to have the same direction as a pointing direction of the pointer.

Figure 3:
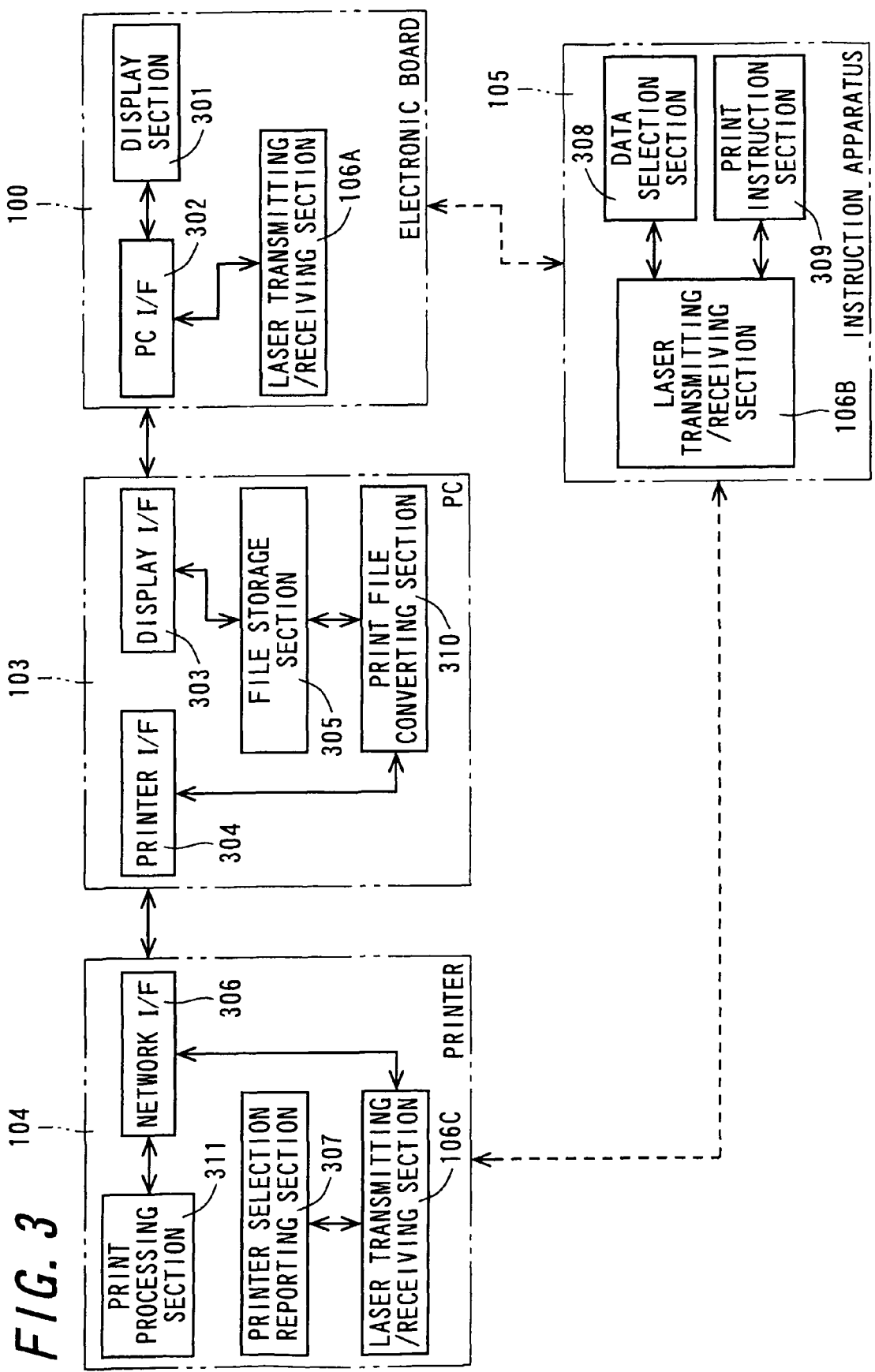
FIG. 3 is a functional block diagram showing the electrical structure of the printing system for meeting.

FIG. 3 is a functional block diagram showing the electrical structure of the printing system for meeting 1.

The electronic board 100 is constituted by including a display section 301 for displaying image data received from the PC 103, a PC I/F (interface) 302 for performing data communication with the PC, and the laser transmitting/receiving section 106A.

The PC 103 includes a display I/F 303 for performing data communication with the electronic board 100, a printer I/F 304 for performing data communication with a printer, a file storage section 305 for storing image data to be displayed on the display section, and a print file converting section 310 for converting into print data printable by the connected printer 104.

The printer 104 includes a network I/F 306 for performing data communication with the PC 103, a printer selection reporting section 307 that, when information indicating a printer specifying operation or information indicating a print instructing operation is received from the instruction apparatus 105, reports the reception to a user, a print processing section 311 for executing printing of print data received from the PC 103, and the laser transmitting/receiving section 106C.

The instruction apparatus 105 includes a data selection section 308 corresponding to the file selection button 201, a print instruction section 309 corresponding to the print decision button 202, and the laser transmitting/receiving section 106B.

Description will be given below for operations of each apparatus when a print instruction of image data is given by the instruction apparatus 105.

Figure 4:
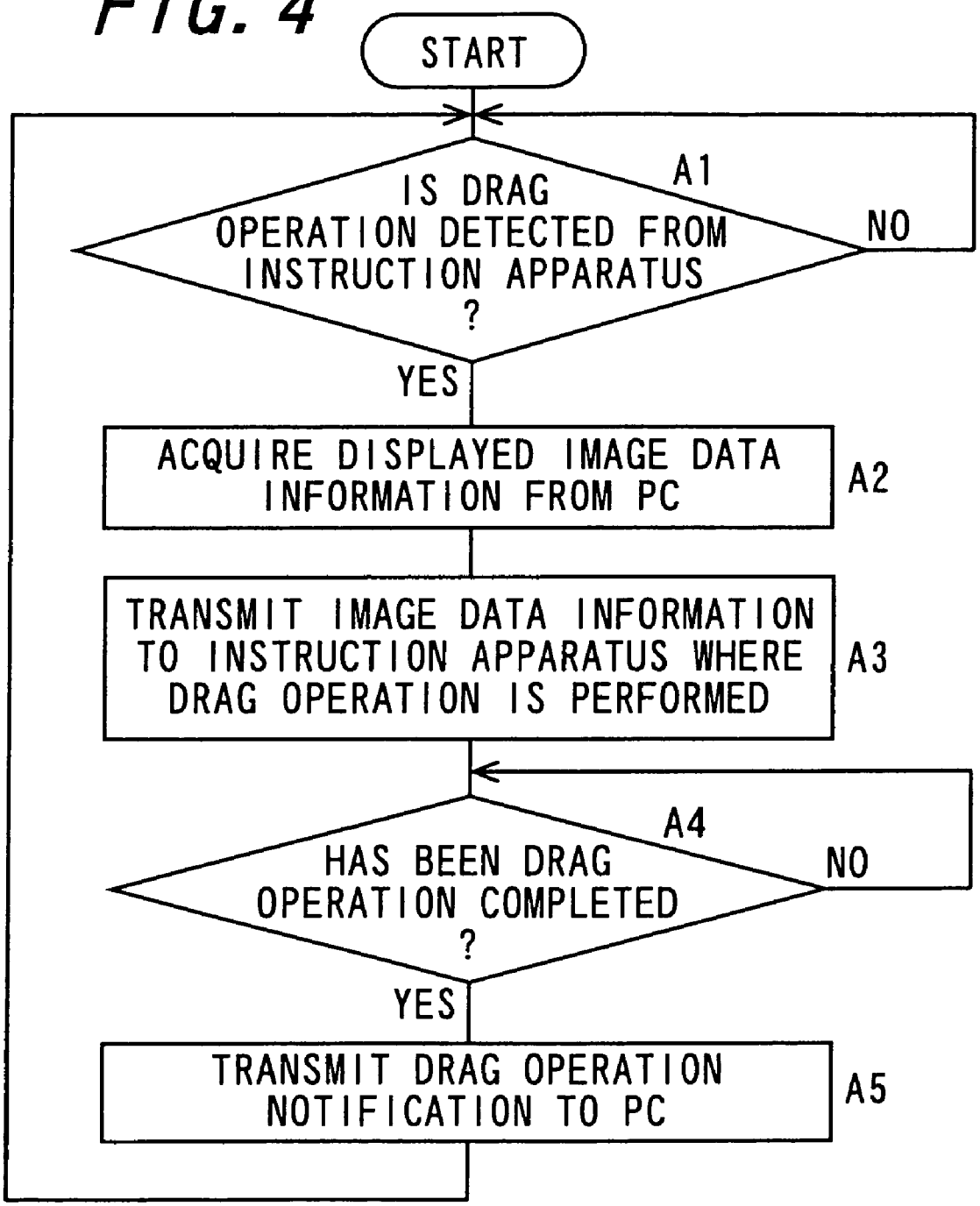
FIG. 4 is a flowchart showing print instruction processing in an electronic board.

FIG. 4 is a flowchart showing print instruction processing in the electronic board 100.

In a state where image data to be printed is displayed, or for example, an icon indicating image data to be printed, or the like is displayed on the display section 301 of the electronic board 100, a print instruction is given by the instruction apparatus 105.

At Step A1, it is determined whether or not information indicating that a drag operation is being performed (drag information) is received from the instruction apparatus 105. Specifically, it is determined whether or not the file selection button 201 of the instruction apparatus 105 is kept pressed (dragged).

When determined that the file selection button 201 is kept pressed, the procedure proceeds to Step A2, and information of image data presently displayed on the display section 301 is acquired from the PC 103, for which image data the drag operation is being performed. The information of the image data is, specifically, information of the PC 103 outputting a file attribute or image data to the electronic board, or the like.

Here, when the information of the image data presently displayed on the display section 301 is acquired, the acquiring is reported to a user. A reporting section is implemented by, specifically, generation of beep sound from a speaker, and/or illumination of an LED (light-emitting diode), but any components may be used as long as it is a component which a user can recognize that the information of the image data presently displayed on the display section 301 has been acquired, that is, the image data displayed on the electronic board 100 has been selected by the instruction apparatus 105.

When the information of the image data has been acquired, at Step A3, the received image data information is transmitted to the input apparatus in which a drag operation is being performed. Then, the procedure proceeds to Step A4, and it is determined whether or not the drag operation in the instruction apparatus 105 has been completed. Specifically, it is determined whether or not the file selection button 201 has been released.

When it is determined that the file selection button 201 has been released, the procedure proceeds to Step A5, and the connected PC 103 is notified of the completion of the drag operation.

Figure 5:
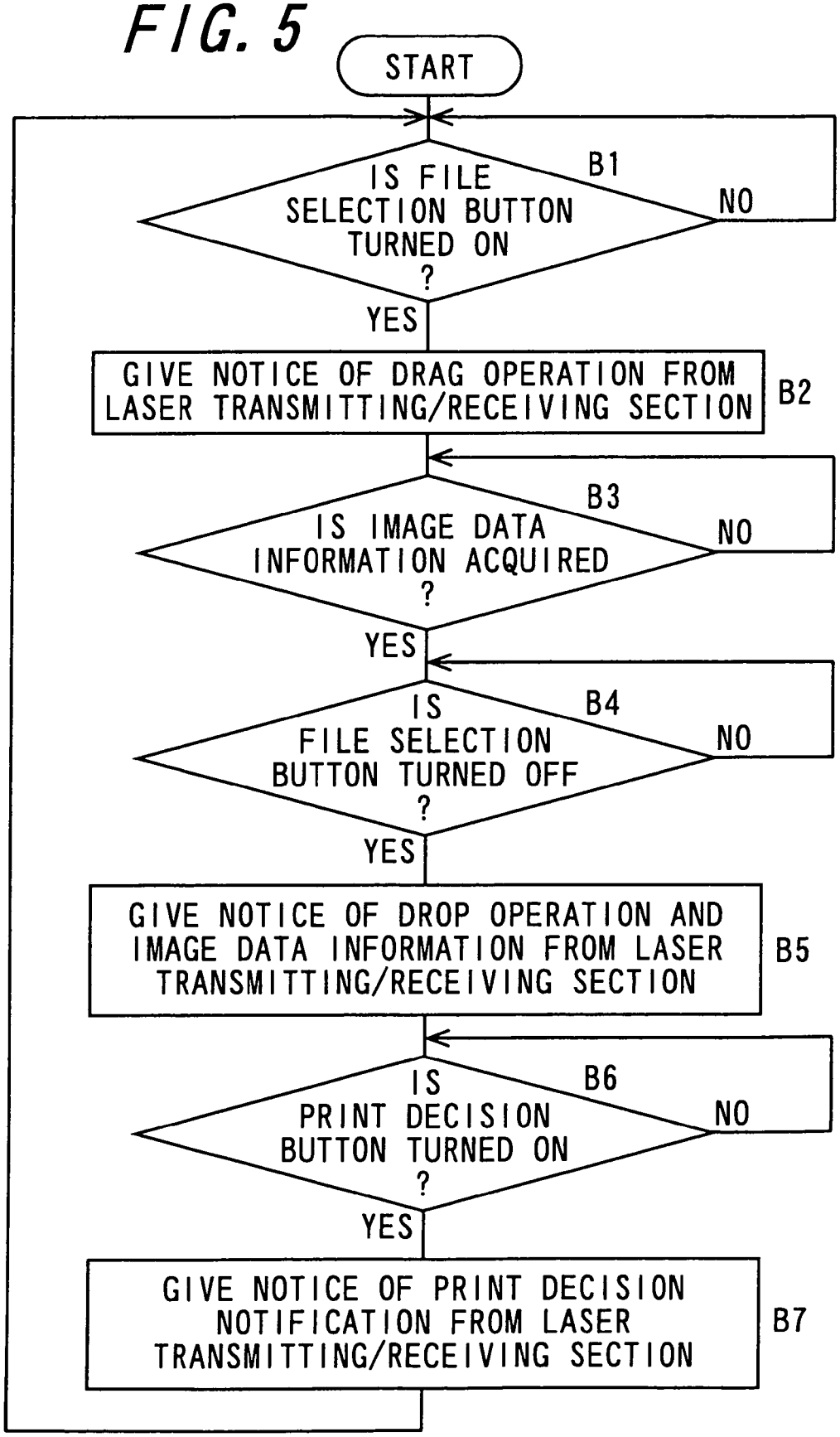
FIG. 5 is a flowchart showing print instruction processing in the instruction apparatus.

FIG. 5 is a flowchart showing print instruction processing in the instruction apparatus 105.

First, at Step B1, it is determined whether or not the file selection button 201 is kept pressed by a user (a drag operation is being performed). When it is determined that the file selection button 201 is kept pressed, the procedure proceeds to Step B2, and information indicating that the drag operation is being performed (drag information) is transmitted from the laser transmitting/receiving section 106B to the electronic board 100.

At Step B3, it is determined whether or not image data information is acquired from the electronic board 100. When the image data information is acquired, the procedure proceeds to Step B4, alternatively, when not acquired, the procedure stands by until acquired.

At Step B4, it is determined whether or not the file selection button 201 is released. When the file selection button 201 is released, the procedure proceeds to Step B5, alternatively, when not released, the procedure stands by until released.

At Step B5, information indicating that the file selection button 201 is released (drop information) and the image data information received from the PC 103 are transmitted from the laser transmitting/receiving section 106B to the printer 104. At this time, the printer 104 specified as a transmission destination serves as a printer 104 that is provided ahead in an irradiating direction of laser emitted from the instruction apparatus 105. Accordingly, the user can specify a printer to print, by directing the instruction apparatus 105 to the specific printer 104.

Next, it is determined whether or not the print decision button 202 is pressed by the user. When it is determined that the print decision button 202 is pressed by the user, information for giving notice of the print decision is transmitted from the laser transmitting/receiving section 106B to the printer 104 to which the instruction apparatus 105 is directed.

Figure 6:
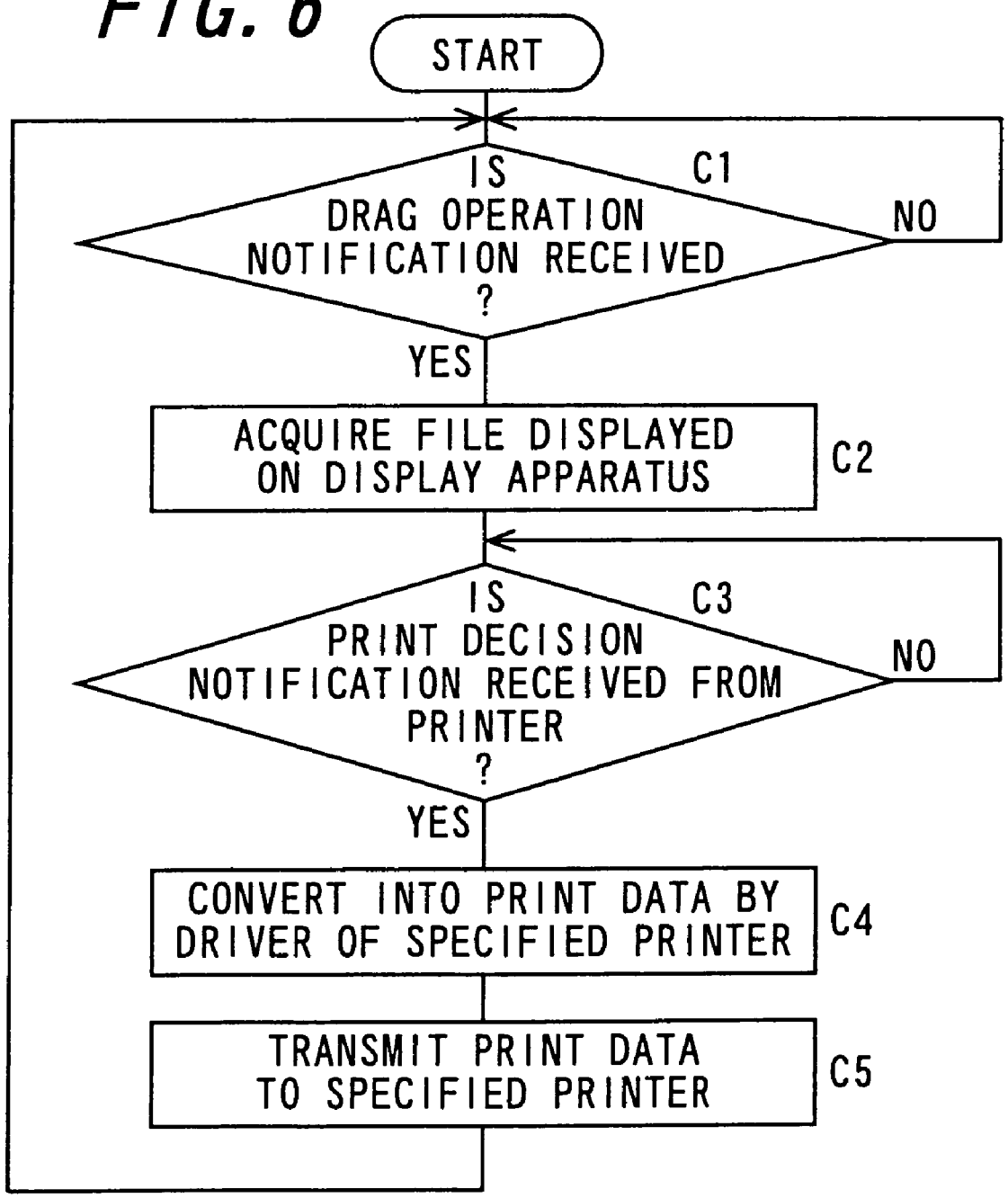
FIG. 6 is a flowchart showing print instruction processing in a PC.

FIG. 6 is a flowchart showing print instruction processing in the PC 103.

At Step C1, it is determined whether or not notification that a drag operation has been performed is received from the electronic board 100. When it is determined that the notification is received from the electronic board 100, the procedure proceeds to Step C2, and image data displayed on the display section 301 of the electronic board 100 is read out from the file storage section 305 to prepare for transmission.

At Step C3, it is determined whether or not the notification of the print decision is received from the connected printer 104. When it is determined that the notification of the print decision is received from the printer 104, at Step C4, the print file converting section 310 performs conversion using a printer driver of the printer 104 to generate print data to be transmitted to the printer 104. Then, at Step C5, the print data after conversion is transmitted to the printer 104.

FIG. 7 is a flowchart showing print instruction processing in the printer 104.

At Step D1, it is determined whether or not drop information and image data information received from the PC 103 are received from the instruction apparatus 105. When it is determined that the drop information and the image data information are received from the instruction apparatus 105, at Step D2, the reception of the drop information is reported to a user. The reporting section, specifically, includes generation of beep sound from a speaker and illumination of an LED (light-emitting diode), but any components may be used as long as it is a component by which a user can recognize that the printer 104 has received the drop information, that is, a print request for the image data displayed on the electronic board 100 has been received, Next, it is determined whether or not information for giving notice of the print decision is received from the instruction apparatus 105. When it is determined that the information for giving notice of the print decision is received from the instruction apparatus 105, the procedure proceeds to Step D4 where transmission of print data is requested to the PC 103, based on the image data information received from the instruction apparatus 105. Then, at Step D5, it is determined whether or not the print data is received from the PC 103, and when the print data is received from the PC 103, at Step D6, printing of the received print data is executed.

While the processing as described above is performed inside the printing system for meeting 1, description for a user's operation when giving a print instruction will be as follows.

First, a user directs the instruction apparatus 105 to the electronic board 100 in a state where an image of image data to be desirably printed is displayed, and presses the file selection button 201. Then, while pressing the file selection button 201, the user directs the instruction apparatus 105 to the printer 104 desirably caused to print. While directing the instruction apparatus 105 to the printer 104, the user releases the file selection button 201.

Further, at this time, the user can recognize that the printer 104 is a print destination by illumination of an LED in the printer 104 and the like.

When the print instruction button 202 is pressed while the instruction apparatus 105 being directed to the printer 104, desired image data is printed from the printer 104 to which the instruction apparatus 105 is directed.

By these operations, it is possible to perform selection of the printer 104 specified as a print destination of image data presently displayed on the electronic board 100 with an operational feeling like a drag and drop operation, and it is possible to give a print instruction with an operational feeling like a click operation, thereby the operations are intuitively performed and the load on a user is reduced significantly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A printing system comprising:
a display apparatus for displaying image data;
a printing apparatus for printing the image data;
an instruction apparatus for instructing to transmit the displayed image data to the printing apparatus; and
a converting apparatus having a file converting section for converting the transmission-instructed image data into print data printable by the printing apparatus specified as a transmission destination,
the display apparatus, printing apparatus, the instruction apparatus, and the converting apparatus being connected so as to allow data communication,
the instruction apparatus including a first input section for selecting image data and a second input section for inputting decision of printing, and
in a state where image data is displayed on the display apparatus, the first input section being operated, and in a state where the first input section is operated, the instruction apparatus being directed to the printing apparatus and an operation at the first inputting section being completed, then
the converting apparatus converting the displayed image data into print data printable by the printing apparatus to which the instruction apparatus is directed to transmit to the printing apparatus, and
in the case where the instruction apparatus is directed to the printing apparatus and the second input section is operated, the printing apparatus printing the print data transmitted from the converting apparatus.

2. The printing system of claim 1, wherein the printing apparatus includes a reporting section for detecting completion of the operation at the first input section and reporting the detection to a user.

3. The printing system of claim 1, wherein the instruction apparatus has an element for indicating that the first inputting section is operating effectively.

4. The printing system of claim 1, wherein the instruction apparatus has an element for indicating that the second input section is operating effectively.

5. The printing system of claim 1, wherein the display apparatus has a reporting section for display for indicating that the displayed image data has been selected by the instruction apparatus.

6. The printing system of claim 1, wherein the printing apparatus has a reporting section for printing for indicating that a print request for the displayed image data has been received.

* * * * *